United States Patent
Bosch et al.

[11] Patent Number: 6,158,215
[45] Date of Patent: Dec. 12, 2000

[54] VARIBLE EXHAUST RESONANCE CHAMBER VALVE SYSTEM FOR TWO-CYCLE ENGINES

[75] Inventors: John Bradley Bosch, Salol; Richard Fredrickson, Roseau; Kevin D. Ness, Hasson; Jan Hedlund, Roseau, all of Minn.

[73] Assignee: Polaris Industries Inc., Minneapolis, Minn.

[21] Appl. No.: 09/190,344

[22] Filed: Nov. 12, 1998

[51] Int. Cl.⁷ .................................................... F02B 27/02
[52] U.S. Cl. ................................... 60/312; 60/312; 60/314; 60/324; 60/322; 181/237; 123/65 P; 123/65 PE; 123/65 EM
[58] Field of Search .............................. 60/312, 313, 314, 60/322, 324; 181/237, 254, 241; 123/65 PE, 65 EM, 65 P

[56] References Cited

U.S. PATENT DOCUMENTS

| | | |
|---|---|---|
| 4,522,029 | 6/1985 | Tomita et al. . |
| 4,539,813 | 9/1985 | Tomita et al. . |
| 4,541,371 | 9/1985 | Kageyama et al. . |
| 4,554,785 | 11/1985 | Oike . |
| 4,558,566 | 12/1985 | Shirakura . |
| 4,570,439 | 2/1986 | Uchinishi . |
| 4,723,514 | 2/1988 | Taniuchi . |
| 4,827,880 | 5/1989 | Ban et al. ............................ 123/65 E |
| 4,909,033 | 3/1990 | Ueda . |
| 4,999,999 | 3/1991 | Takahashi et al. . |
| 5,000,131 | 3/1991 | Masuda . |
| 5,063,888 | 11/1991 | Ozawa et al. ....................... 123/65 PE |
| 5,189,266 | 2/1993 | Sasaki et al. . |
| 5,317,112 | 5/1994 | Lee . |
| 5,502,963 | 4/1996 | Inaba ........................................ 60/314 |
| 5,575,246 | 11/1996 | Ito . |
| 5,752,476 | 5/1998 | Nakamura ........................... 123/65 PE |

FOREIGN PATENT DOCUMENTS

| | | | |
|---|---|---|---|
| 2707343 | 1/1995 | France .................................... 60/324 |
| 5156921 | 6/1993 | Japan ...................................... 60/234 |

*Primary Examiner*—Thomas Denion
*Assistant Examiner*—Binh Tran
*Attorney, Agent, or Firm*—Fredrikson & Byron, P.A.

[57] ABSTRACT

A variable exhaust resonance chamber valve system for internal combustion engine. The engine includes a cylinder having an exhaust port with an axial extent along the axis of the cylinder structure. An exhaust passage having a resonance port extends from the exhaust port to exhaust the engine. A resonance chamber extends from the resonance port and communicates with the exhaust passage through the resonance port. A port valve is adjustable between a second position, in which the port valve exposes the exhaust port throughout its axial extent and occludes the resonance port, and a first position, in which the port valve restricts the axial extent of the exhaust port and exposes the resonance port. A valve control module is connected to the port valve and functions to adjust the port valve between first and second positions in response to engine conditions. At low speeds and low output conditions, the valve is in its first position. At higher speeds and under higher output conditions, the valve control module moves the valve to its second position.

25 Claims, 4 Drawing Sheets

VARIBLE EXHAUST RESONANCE CHAMBER VALVE SYSTEM FOR TWO-CYCLE ENGINES

TECHNICAL FIELD

The present invention relates to two-cycle internal combustion engines, and in particular, to a variable exhaust resonance chamber valve system for two-cycle internal combustion engines.

BACKGROUND OF THE INVENTION

Two-cycle engines generally have exhaust and intake ports in the side walls of a cylindrical combustion chamber (usually referred to simply as a cylinder). The intake ports or inlet valves feed an air and fuel mixture to the cylinder for combustion. The exhaust port opens to an exhaust passage system where the engine's combusted gases are released. Among its several functions, the reciprocation of the piston in the cylinder across each port cyclically seals and opens each port to effect the proper movement of gases through the engine. Since the ports' locations remain fixed within the cylinder, the exhaust port and intake ports are opened and closed at a fixed time and location with respect to the piston's movement during the engine's cycle.

The timing of the engine's cycle for opening and closing the exhaust port and intake ports directly affects the entire engine operation, including its horsepower, fuel efficiency, emissions toxicity, and even its ability to sustain continuous operation. In addition, optimal valve timing varies depending upon the engine speed and load. At high engine speeds, keeping the exhaust port open longer will improve engine performance. If such longer duration is permanently fabricated into the cylinder design, however, the engine will perform poorly at low speeds, where a comparatively shorter exhaust-port-open duration produces better performance.

Thus, unless one can vary the otherwise fixed timing of the exhaust port, the engine will only perform optimally at a certain rpm range. A number of attempts to remedy this problem have been made, including one disclosed in Applicant's U.S. patent application, Ser. No. 08/955,659, now issued as U.S. Pat. No. 5,873,334. Commonly these prior art engines provide some mechanism for covering the upper portion of the exhaust port under low speed operation, effectively lowering the top of the exhaust port in the cylinder to reduce the length of time that the port is open during the engine's cycle. Prior art engines also provide a mechanism to vary the height or axial extent of the exhaust port depending upon various parameters of the engine's operation.

Besides varying the exhaust port opening, prior art engines have also used various exhaust passage configurations to improve engine power and efficiency. Early exhaust systems featured a simple, straight exhaust pipe. These passages created a negative pressure wave to rid the cylinder of combusted gases and prepare the cylinder for a new charge. Later, it was found that the pressure created by the exhaust gas pulsation wave upon reflection from the open end of the exhaust pipe may be used to improve the engine's power and efficiency. A reflected pressure wave that arrives at the exhaust port with positive pressure may be used to urge an uncombusted air/fuel charge that has been discharged into the exhaust passage back through the open exhaust port into the interior of the cylinder. Alternatively, a reflected negative pressure wave may be used to pull spent gases out of the cylinder and prepare the cylinder for a new charge. Once an exhaust passage is fabricated, however, the effects of these pressure waves are optimal at only one particular engine speed. At other engine speeds, the geometry of the exhaust passage may result in the reflected wave returning too soon (before the port opens), or too late (sucking an uncombusted air/fuel charge out of the cylinder), thereby disrupting optimal engine operation.

Various solutions attempting to solve this problem have been proposed. For instance, U.S. Pat. No. 4,539,813, issued to Tomita et al., and U.S. Pat. No. 4,558,566, issued to Shirakura, each disclose engines employing a subsidiary chamber, or resonance chamber, in communication with the exhaust passage through a port in the exhaust passage. Such engines use a valve to open this resonance chamber port at low speed operation and close the valve at high speed operation. Thus, at low engine speeds that would otherwise create an undesired negative pressure wave at the exhaust port, the resonance chamber is opened to change such waves into positive pressure ones.

In many cases such prior art systems may respond inaccurately or relatively slowly to changing engine conditions, such as fast acceleration or deceleration. Instead, these resonance chamber valves often operate at fixed speeds.

Accordingly, it is desirable to more accurately vary the resonance chamber port opening. It would also be desirable to have an engine that employs both a variable exhaust valve system and a variable resonance chamber port system. Additionally, it would be desirable to have a single control module for adjusting both the exhaust port opening and the resonance chamber opening. It may be desirable to have the one control module respond to the same, sensed engine condition for adjusting the exhaust port opening and the resonance chamber opening. Also, it may desirable to use a single port valve for both the exhaust port and the resonance chamber port.

SUMMARY OF THE INVENTION

The invention provides a variable exhaust resonance chamber valve system for an internal combustion engine. The engine includes a cylinder having an exhaust port with an axial extent along the axis of the cylinder structure. A piston is axially reciprocable in the cylinder bore. The piston is adapted to open and close the exhaust port as it reciprocates up and down. An exhaust passage for exhausting combustion gases from the cylinder during engine operation extends from the exhaust port and has a resonance port. A resonance chamber is placed in fluid communication with the exhaust passage through the resonance port. A port valve is mounted adjacent the exhaust port and adjacent the resonance port. The port valve is adjustable between a second position, in which the exhaust port valve exposes the exhaust port throughout its axial extent but occludes the resonance port, and a first position, in which the port valve restricts the axial extent of the exhaust port but exposes the resonance port. A valve control module is connected to the port valve and functions to adjust the port valve between the first and second positions in response to an engine parameter. At low speeds and low output conditions, the valve is in its first position. At higher speeds and under higher output conditions, the valve control module moves the valve to its second position.

DETAILED DESCRIPTION OF THE INVENTION

Figure 1:
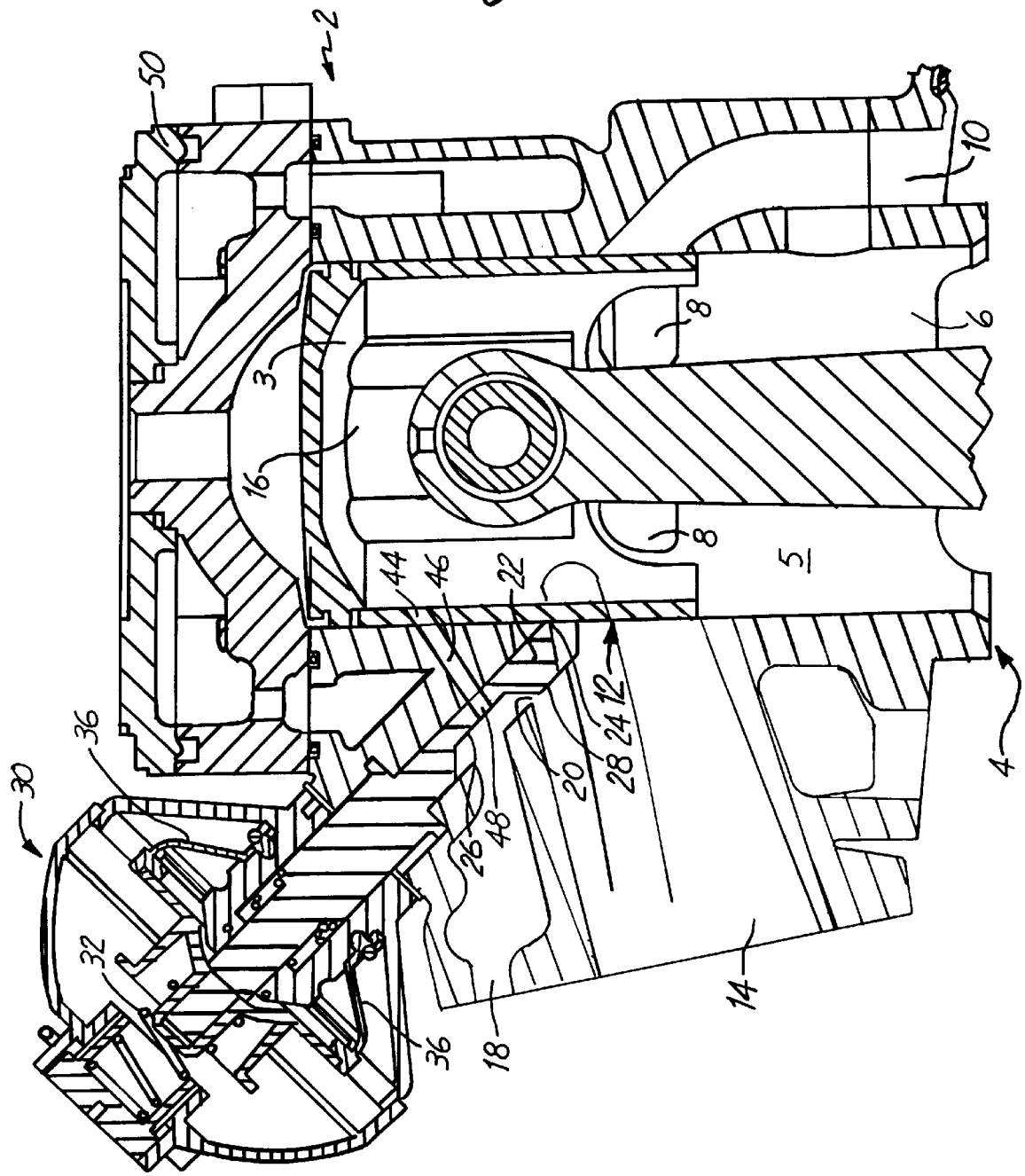
FIG. 1 is a cross-sectional view showing the relevant portion of a two-cycle engine in accordance with one embodiment of the present invention.
Figure 2:
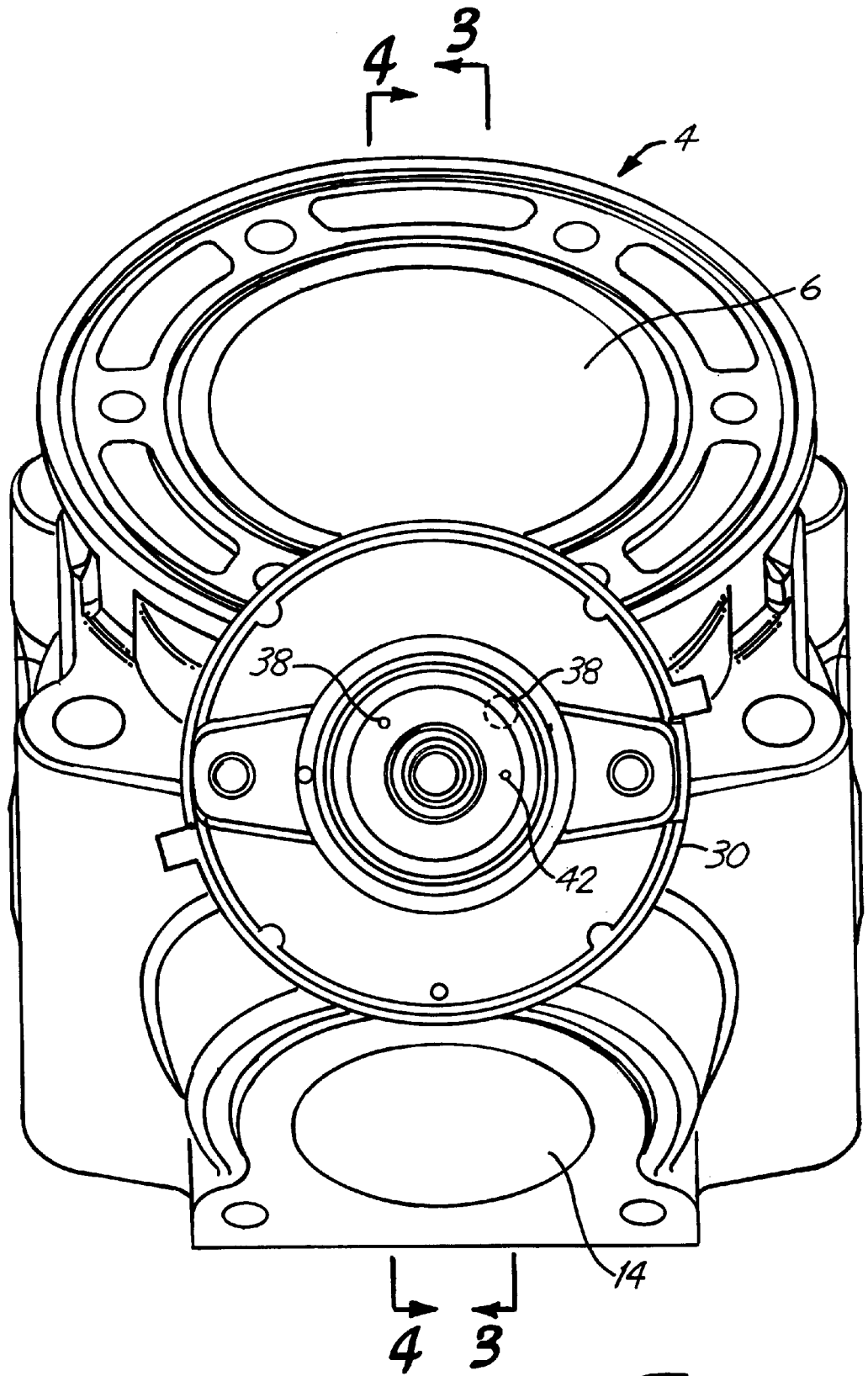
FIG. 2 is a perspective view of a portion of a cylinder block of the invention, showing internal structure of a valve control module.

The drawings depict a preferred embodiment of an engine incorporating the variable exhaust resonance chamber valve device of the invention. It will be understood, however, that many of the specific details of the variable exhaust resonance chamber valve system illustrated in the drawings could be changed or modified by one of ordinary skill in the art without departing significantly from the spirit of the invention.

As shown in FIGS. 1–4, a preferred embodiment of an engine incorporating the variable exhaust resonance chamber valve system of the present invention includes an engine block 2 having at least one combustion chamber 3. The combustion chamber 3 comprises a cylinder 4 having a cylindrical interior wall 5 which defines a cylinder bore 6. Intake ports 8 are formed in the cylinder which connect to an intake passage 10. During engine operation, air-fuel mixture is supplied to the cylinder bore 6 through the intake ports 8. An exhaust port 12 is also formed in the cylinder wall 5 and it connects to an exhaust passage 14 for exhausting combustion gases from the cylinder 4 during engine operation. A piston 16 is disposed in the cylinder 4 and is designed to reciprocate in the cylinder 4 upward in a compression stroke and downward in a power stroke. Among its functions, the piston reciprocates across both the intake ports 8 and the exhaust port 12 to open and close them at the proper times during operation of the engine. That is, as the piston 16 reciprocates across the intake ports 8, it alternately opens and sealingly closes the intake ports 8, thereby permitting and blocking, respectively, communication between the intake passage 10 and the cylinder bore 6. Similarly, as the piston 16 reciprocates across the exhaust port 12, it alternately opens and closes the exhaust port 12, thereby permitting and blocking, respectively, communication between the exhaust passage 14 and the cylinder bore 6.

A subsidiary chamber, or resonance chamber 18, is located adjacent to the exhaust passage 14. The resonance chamber 18 may be positioned and shaped in several different ways, as is generally known in the art. In the preferred embodiment, the resonance chamber 18 surrounds the exhaust passage 14. The resonance chamber 18 extends from a resonance port 20 located in the wall of the exhaust passage 14. The resonance chamber 18 is in fluid communication with the exhaust passage 14 through the resonance port 20. The resonance chamber 18 may, therefore, be used to both assist the exhaust passage 14 in exhausting combustion gases during engine operation as well as alter the configuration of the exhaust system to improve the engine's power and efficiency.

A port valve 22 is mounted adjacent to both the exhaust port 12 and the resonance port 20. The port valve 22 shown in FIG. 1 is of a conventional sliding plate type, such as that shown in U.S. Pat. No. 4,121,552 issued on Oct. 24, 1978, to Mithuo et al. Port valves 22 other than the conventional sliding plate may be used.

The port valve 22 shown in FIG. 1 has a leading edge 24 adjacent the exhaust port 12 and a channel 26 with a lip 28 located adjacent to the resonance port 20. The port valve 22 is slidable between two extreme positions, a first position and a second position.

In the second position (shown in FIG. 3), the port valve 22 is retracted from the cylinder wall 6 to expose the entire axial extent of the exhaust port 12 to the exhaust passage 14. Also when in the second position, the port valve's rear edge or lip 28 is retracted into alignment with the resonance port 20, effectively occluding the resonance port and blocking fluid communication between the resonance chamber 18 and the exhaust passage 14.

In the first position (shown in FIG. 1) the port valve 22 extends until the leading edge 24 is flush with the cylinder wall 5, thereby covering the upper portion of the exhaust port 12 and effectively shortening the axial extent of the exhaust port 12. Also, when in the first position the port valve lip 28 extends through the resonance port 20 and into the exhaust passage 14. In this position, the port valve channel 26 provides a conduit for fluid communication between the resonance chamber 18 and the exhaust passage 14.

Although the preferred embodiment features a port valve 22 comprised of a conventional sliding plate, such as that shown in U.S. Pat. No. 4,121,552 issued on Oct. 24, 1978, to Mithuo et al., other port valves 22 may be used. The Mithuo reference, hereby incorporated by reference, discloses at least three other port valves 22 which may be used: a rotatable rod having at least one aperture, a rotatable valve member, and a pair of disc shaped portions and at least one blocking portion between the pair of disc shaped portions.

These different types of port valves may be used alone or in combination to achieve the port valve 22 of the present invention. For instance, a rotatable rod port valve may be used as an exhaust port valve in place of the sliding plate's leading edge 24 to restrict or expose the axial extent of the exhaust port 12, and a separate rotatable valve member may be used as a resonance port valve instead of the sliding plate's channel 26 and lip 28 to occlude or expose the resonance port 20. In an alternate embodiment, two rotatable rod port valves may be used, each with one aperture which may be rotated to occlude or expose the exhaust port 12 and the resonance port 20, respectively. In another embodiment, a single rotatable rod port valve having two apertures may be used, similar to the use of a single sliding plate port valve, to valve both the exhaust port 12 and the resonance port 20.

Figure 3:
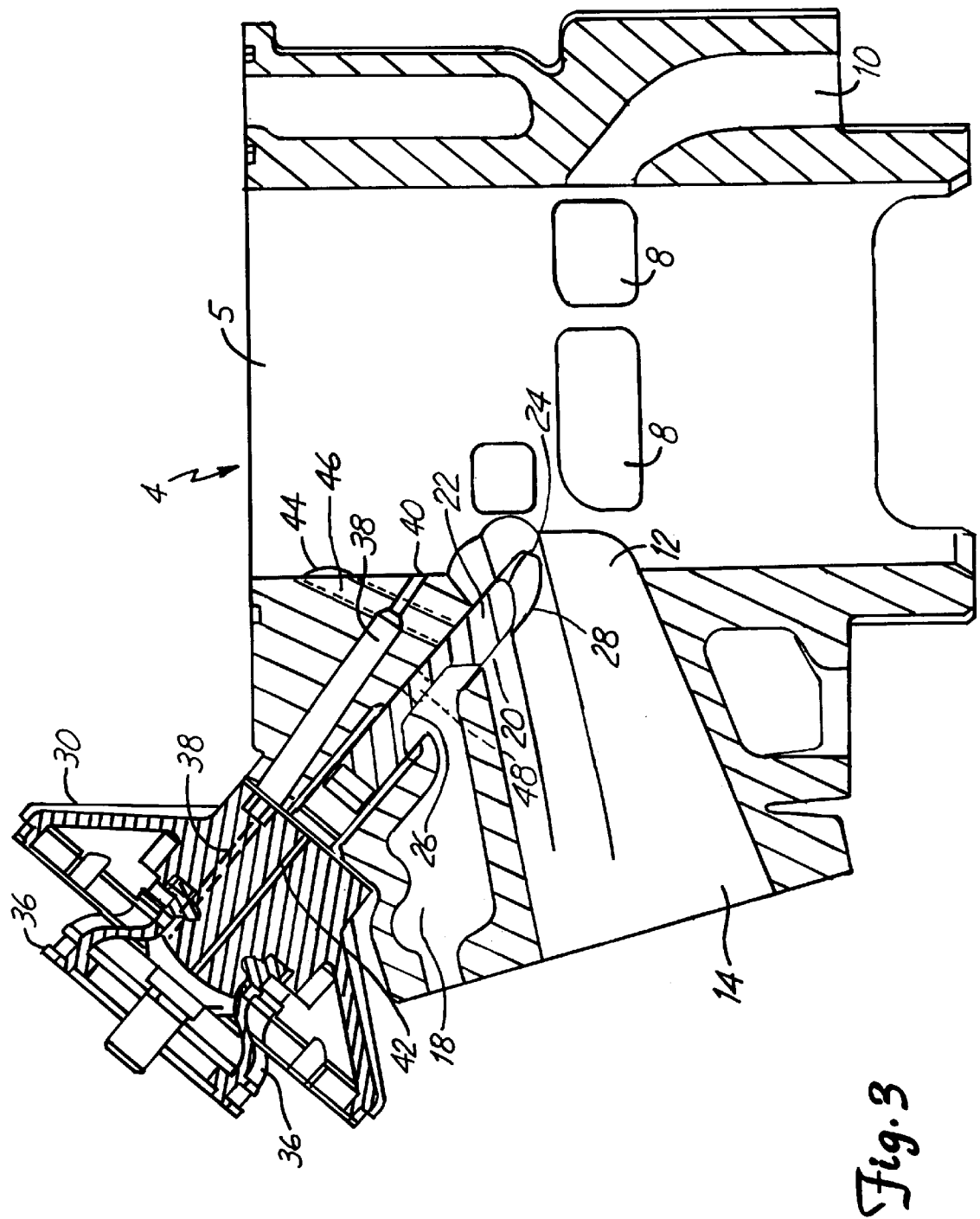
FIG. 3 is a cross-sectional view of FIG. 2, taken along lines 3—3 thereof.
Figure 4:
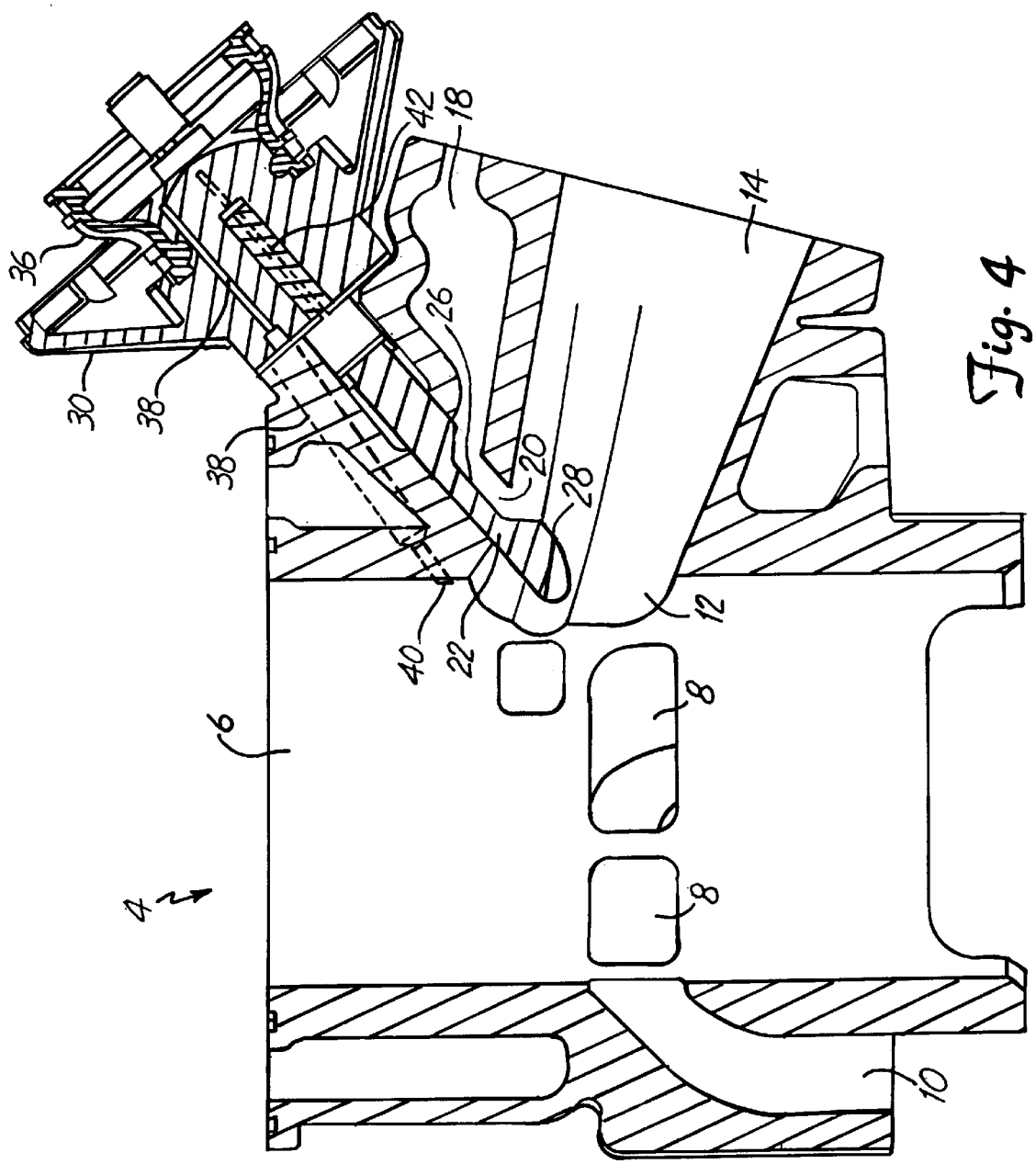
FIG. 4 is a cross-sectional view of FIG. 3, taken along lines 4—4 thereof.

As shown in FIGS. 1, 3, and 4, a valve control module 30 is provided for adjusting the position of the port valve 22. Such control modules are well known, and need not be described in great detail. The control module may be, e.g., of the type shown in Applicant's pending U.S. application Ser. No. 08/955,659, filed Oct. 22, 1997; U.S. Pat. No. 4,399,788 issued on Aug. 23, 1983, to Bostelmann; or of any other suitable design for controlling the position of the port valve 22. Typically the valve control module 30 includes a biasing mechanism (such as coil spring 32) positioned to urge the port valve 22 toward the first position, and a sensor adapted to move the port valve 22 from the first position toward the second position in response to a sensed engine parameter. In the preferred embodiment (as discussed in Applicant's pending U.S. patent application Ser. No. 08/955,659, herein incorporated by reference), the sensed engine parameter is the gas pressure developed by the piston 16 in the cylinder bore 6. However, the sensor may be adapted to move the port valve 22 from the first position toward the second position in response various other engine parameters, such as gas pressure developed in the exhaust passage 14 (as in Bostelmann, herein incorporated by reference); throttle position (as in U.S. Pat. No. 4,121,552 issued on Oct. 24, 1978 to Mithuo et al., herein incorporated by reference); engine speed (as in U.S. Pat. No. 4,723,514 issued on Feb.

9, 1988 to Taniuchi, herein incorporated by reference), or engine load using a combination of speed and throttle position (as in U.S. Pat. No. 5,000,131, issued on Mar. 19, 1991 to Masuda, herein incorporated by reference).

The gas pressure sensor typically includes a diaphragm 36 movable in response to a gas pressure differential on opposing sides of the diaphragm 36—a fixed pressure (such as ambient pressure) is provided on one side of the diaphragm 36, and the other side of the diaphragm 36 is exposed to the cylinder pressure. When cylinder pressure is sufficient to overcome the spring 32, the diaphragm 36 moves upwardly, retracting the port valve 22 from the first position.

Thus, during low speed engine operation, the port valve 22 remains biased in the first position due to the low gas pressure in the cylinder bore 6. As the engine speed increases, the cylinder bore gas pressure also increases. The valve control module 30 responds to the added cylinder bore gas pressure and begins to retract the port valve 22 until it reaches the second position.

Two areas of engine operation are affected as the valve control module 30 responds to the cylinder bore gas pressure (or other sensed engine parameter), the exhaust port timing and the exhaust passage's configuration. As engine speed increases and the sensor responds to the increased cylinder bore gas pressure by retracting the port valve 22, the port valve 22 begins to expose the upper portion of the exhaust port 12 to the exhaust passage 14. This, in turn, advances the timing of when the exhaust port 12 opens during the piston's power stroke. When the engine speed decreases, the valve control module 30 responds to the decreased cylinder bore gas pressure by extending the port valve 22. This, in turn, retards or delays the timing of when the exhaust port opens during the piston's power stroke.

With regard to the exhaust passage's configuration, at high engine speeds the sensor retracts the port valve 22 so that its lip 28 is aligned with the resonance port 20. This effectively occludes the resonance port 20 and blocks fluid communication between the resonance chamber 18 and the exhaust passage 14. The exhaust passage 14 is designed to exhaust the cylinder 4 most efficiently and effectively at high speeds. In other words, the exhaust passage 14 is designed to provide the reflected exhaust gas pulsation wave (the exhaust gas pulsation wave reflected off the open end of the exhaust passage 14) at a positive pressure at the exhaust port 12, when the exhaust port 12 opens. This reflected positive pressure wave may be used to urge an uncombusted air/fuel charge that has been discharged into the exhaust passage 22 back into the cylinder 4. Alternatively, the exhaust passage 14 may be designed to provide the reflected exhaust pulsation wave at negative pressure at the exhaust port 12, when the exhaust port 12 opens. This negative pressure wave may be used to pull spent gases out of the cylinder 4 and prepare the cylinder 4 for a new air/fuel charge.

As the engine speed decreases, the valve control module 30 responds to the decreased cylinder bore gas pressure by extending the port valve 22. When the port valve 22 extends to a point where its lip 28 extends through the resonance port 20 and into the exhaust passage 14, the resonance chamber 18 is placed in fluid communication with the exhaust passage 14, using the port valve channel 26 as a conduit therefor. When in fluid communication, the resonance chamber 18 may assist the exhaust passage 14 in exhausting combustion gases during engine operation. In addition, the addition of the resonance chamber 18 to the exhaust path alters the exhaust system's configuration.

At low engine speeds, the geometry of the exhaust passage 14 alone, absent the resonance chamber 18, may cause the reflected exhaust pulsation wave to return too soon (before the port opens), or too late (sucking the uncombusted air/fuel charge out of the cylinder). The resonance chamber 18 is designed so that its addition to the exhaust path will cause the reflected exhaust pulsation wave to arrive at the exhaust port 12 with positive pressure when the exhaust port 12 opens. This reflected positive pressure wave may be used to urge an uncombusted air/fuel charge that has been discharged into the exhaust passage 22 back into the cylinder 4. Alternatively, the resonance chamber 18 may be designed so that its addition to the exhaust path will cause the reflected exhaust pulsation wave to arrive at the exhaust port 12 with negative pressure when the exhaust port 12 opens. This negative pressure wave may be used to pull spent gases out of the cylinder 4 and prepare the cylinder 4 for a new air/fuel charge. Either embodiment may be used to optimize the engine's operation.

A convenient way of connecting the valve control module 30 to the engine is by providing an air pressure sensing passageway 38 which terminates in a pressure sensing port 40 formed in the cylinder wall 5. This port 40 may be located in a variety of positions within the cylinder 4, but preferably is located at a position vertically above the uppermost edge of the exhaust port 12. The piston will therefore block the pressure sensing port 40 during part of the stroke particularly during the very top portion of the compression stroke). However, the piston will expose the pressure sensing port 40 to cylinder bore pressure both before the exhaust port 12 opens in the piston's power stroke and after the exhaust port 12 closes in the piston's compression stroke. Thus, the valve control module 30 responds to cylinder bore gas pressure before the exhaust port opens. The valve control module 30 may respond quickly to changing engine conditions and function entirely independently of the exhaust system.

Depending on the type of control module utilized it can be desirable to provide a dampening orifice 42 to dampen out the pressure pulses sensed by the control module 30 as the engine cylinder 4 fires. The dampening orifice 42 connects the cylinder pressure side of the diaphragm 36 to a lower pressure region in the engine, such as the exhaust port, the crankcase, the engine intake, or other suitable low pressure location (even ambient pressure). In the preferred embodiment shown in the drawings the dampening orifice 42 connects the cylinder pressure side of the diaphragm 36 to the cavity in which the port valve 22 slides, the tolerances between the valve 22 and the cavity permitting a small amount of bleed out of pressure pulses. Such a dampening orifice helps to extend the life of the diaphragm 36 and also bleeds off any unwanted gas, oil or other fluids that otherwise could become trapped within the control module.

The cylinder 4 can also include a decompression port 44 formed in the cylinder wall 5. The decompression port 44 is located higher in the cylinder wall than the exhaust port 12. The decompression port 44 connects to a decompression passage 46 which preferably connects into the exhaust passage 14 or the resonance chamber 18. Instead of the exhaust passage 14 or the resonance chamber 18, the decompression passage 46 may also connect into the crankcase, the engine intake, or other suitable low pressure location (even ambient pressure). Besides valving the exhaust port 12 and the resonance port 20, port valve 22 may be used to valve the decompression port and passage. For instance, as shown in FIG. 1, when port valve 22 is in the first position, an orifice 48 in the port valve 22 is aligned with the decompression passage, thereby opening the decompression passage 46 between the decompression port 44 and the exhaust passage 14. Conversely, when the port valve 22 is in the second position (as shown in FIG. 3), the port valve orifice is moved out of alignment with the decompression passage 46. In this position, the port valve 22 blocks the decompression passage 46.

The main function of the decompression port and passage is to reduce cylinder bore pressure during engine start-up. In a typical engine's cycle, the combustion chamber closes as the piston reciprocates upward in the cylinder and closes the exhaust port. As the piston continues upward in the cylinder, the cylinder bore gas pressure increases. When port valve 22 is in the first position (e.g., such as during engine start-up or low RPM), the decompression port of the present invention reduces the cylinder bore gas pressure. Since the decompression port is located higher in the cylinder than the exhaust port, the decompression port and passage will bleed off part of the pressure building up in the cylinder bore. When the piston finally reciprocates high enough in the cylinder past the decompression port, the piston closes off and seals the decompression port. By reducing the cylinder bore gas pressure during engine start-up, the force necessary to initiate reciprocation of the piston is also reduced. For instance, if the engine is started manually via a manual pull starter, the pulling force necessary to initiate reciprocation of the piston is reduced when the decompression port is open. Thus, simply put, the engine is easier to start.

At higher engine speeds, though, higher cylinder bore pressure is desirable. The engine of the present invention also provides this desired feature. At higher engine speeds (or in response to other engine parameters), the port valve 22 is shifted into the second position where it blocks the decompression passage and effectively closes the decompression port. In this position, the port valve 22 prevents the decompression port from bleeding off engine pressure after the piston closes the exhaust port.

While a preferred embodiment of the present invention has been described, it should be understood that various changes, adaptations and modifications may be made therein without departing from the spirit of the invention and the scope of the appended claims. For instance, although the figures show a single port valve 22 to valve the exhaust port, resonance port and decompression port, different types of port valves may be used alone or in combination to achieve the port valve 22 of the present invention. A separate decompression port valve could be used to valve the decompression port. In addition, the decompression port could alternatively be located in the cylinder head 50 instead of the cylinder wall 5.

What is claimed is:

1. An internal combustion engine comprising:
    a cylinder structure having an inside surface defining a cylinder bore having an axis, the inside surface having an exhaust port with an axial extent along the axis of the cylinder bore;
    a piston axially reciprocable in the cylinder bore and adapted to open and close the exhaust port;
    an exhaust passage extending from the exhaust port, the exhaust passage having a resonance port;
    a resonance chamber in fluid communication with the exhaust passage through the resonance port;
    a single port valve mounted adjacent the exhaust port and the resonance port, the port valve being adjustable between a first position, in which the port valve restricts the axial extent of the exhaust port and exposes the resonance port, and a second position, in which the port valve exposes the exhaust port throughout its axial extent and occludes the resonance port;
    a valve control operatively connected to the port valve and operable to adjust the port valve between the first and second positions in response to an engine parameter.

2. The engine of claim 1 wherein the piston is operable to develop a cylinder bore pressure and wherein the engine parameter is the cylinder bore pressure.

3. The engine of claim 1 wherein the exhaust passage develops an exhaust passage pressure and wherein the engine parameter is the exhaust passage pressure.

4. The engine of claim 1 wherein the engine parameter is speed.

5. The engine of claim 1 wherein the engine parameter is load.

6. The engine of claim 1 wherein the port valve comprises a sliding plate having front and rear edges.

7. The engine of claim 6 wherein the front edge of the sliding plate restricts the axial extent of the exhaust port when the port valve is adjusted to the first position.

8. The engine of claim 6 wherein the rear edge of the sliding plate occludes the resonance port when the port valve is adjusted to the second position.

9. The engine of claim 1 wherein adjusting the port valve adjusts exhaust port timing.

10. An internal combustion engine comprising:
    a cylinder structure having an inside surface defining a cylinder bore having an axis, the inside surface having an exhaust port with an axial extent along the axis of the cylinder bore;
    a piston axially reciprocable in the cylinder bore and adapted to open and close the exhaust port;
    an exhaust passage extending from the exhaust port, the exhaust passage having a resonance port;
    a resonance chamber in fluid communication with the exhaust passage through the resonance port;
    a port valve mounted adjacent the exhaust port and the resonance port, the port valve being adjustable between a first position, in which the port valve restricts the axial extent of the exhaust port and exposes the resonance port, and a second position, in which the port valve exposes the exhaust port throughout its axial extent and occludes the resonance port;
    a valve control operatively connected to the port valve and operable to adjust the port valve between the first and second positions in response to an engine parameter, the piston being operable to develop a cylinder bore pressure, the valve control comprising a biasing mechanism positioned to urge the port valve toward the first position and a cylinder bore pressure sensor adapted to move the port valve from the first position toward the second position in response to an increase of the cylinder bore pressure.

11. The engine of claim 6 wherein the cylinder bore pressure sensor includes a diaphragm movable in response to a gas pressure differential on opposing sides of the diaphragm, a high pressure side of the diaphragm being in fluid communication with the cylinder bore to provide the cylinder bore pressure to such side of the diaphragm during at least a portion of the reciprocable movement of the piston.

12. An internal combustion engine comprising:
    an engine having at least one combustion chamber;
    an exhaust passage extending from the combustion chamber, the exhaust passage having a resonance port, the engine being operable to develop an exhaust gas pressure in the exhaust passage;
    a resonance chamber in fluid communication with the exhaust passage through the resonance port;

a port valve adjacent the resonance port and adjustable between a first position, in which the port valve exposes the resonance port, and a second position, in which the port valve occludes the resonance port; and a valve control operatively connected to the port valve and operable to adjust the port valve between the first and second positions in response to the exhaust gas pressure developed by the engine.

13. The engine of claim 12 wherein the port valve comprises a sliding plate.

14. The engine of claim 12 wherein the valve control comprises a biasing mechanism positioned to urge the port valve toward the first position and an exhaust gas pressure sensor adapted to move the port valve from the first position toward the second position in response to an increase of the exhaust gas pressure.

15. The engine of claim 14 wherein the valve control includes a pressure sensing port formed in the exhaust passage, the pressure sensing port being in communication with the exhaust gas pressure sensor.

16. An internal combustion engine comprising:

an engine having at least one combustion chamber, the engine being operable to develop a combustion chamber gas pressure;

an exhaust passage extending from the combustion chamber, the exhaust passage having a resonance port;

a resonance chamber in fluid communication with the exhaust passage through the resonance port;

a port valve adjacent the resonance port and adjustable between a first position, in which the port valve exposes the resonance port, and a second position, in which the port valve occludes the resonance port; and a valve control operatively connected to the port valve and operable to adjust the port valve between the first and second positions in response to the combustion chamber gas pressure.

17. The engine of claim 16 wherein the valve control comprises a biasing mechanism positioned to urge the port valve toward the first position and a combustion chamber gas pressure sensor adapted to move the port valve from the first position toward the second position in response to an increase of the combustion chamber gas pressure.

18. The engine of claim 17 wherein the valve control includes a pressure sensing port formed in the combustion chamber, the pressure sensing port being in communication with the combustion chamber gas pressure sensor.

19. An internal combustion engine comprising:

a cylinder structure having an inside surface defining a cylinder bore having an axis, the inside surface having an exhaust port with an axial extent along the axis of the cylinder bore, the inside surface having a decompression port located axially higher in the cylinder bore than the exhaust port;

a piston axially reciprocable in the cylinder bore and operable to develop a cylinder bore pressure in the cylinder bore, the piston being adapted to open and close the exhaust port and the decompression port;

an exhaust passage extending from the exhaust port;

a decompression passage extending from the decompression port and into the exhaust passage;

a port valve mounted adjacent the exhaust port and the decompression port, the port valve being adjustable between a first position, in which the port valve restricts the axial extent of the exhaust port and exposes the decompression passage, and a second position, in which the port valve exposes the exhaust port throughout its axial extent and blocks the decompression passage, the decompression passage reducing the cylinder bore pressure when the port valve exposes the decompression passage;

a valve control operatively connected to the port valve and operable to adjust the port valve between the first and second positions in response to an engine parameter.

20. The engine of claim 19 wherein the decompression passage comprises a passage through the port valve.

21. The engine of claim 20 wherein the passage through the port valve is aligned with the decompression port when the port valve is in the first position.

22. The engine of claim 21 wherein the passage through the port valve is out of alignment with the decompression port when the port valve is in the second position.

23. The engine of claim 19 wherein the exhaust passage has a resonance port, and further including a resonance chamber in fluid communication with the exhaust passage through the resonance port.

24. The engine of claim 23 wherein the port valve is mounted adjacent the resonance port, and in the first position the port valve exposes the resonance port and in the second position the port valve occludes the resonance port.

25. An internal combustion engine comprising:

a cylinder structure having an inside surface defining a cylinder bore having an axis, the inside surface having an exhaust port with an axial extent along the axis of the cylinder bore, the inside surface having a decompression port located axially higher in the cylinder bore than the exhaust port;

a piston axially reciprocable in the cylinder bore and adapted to open and close the exhaust port and the decompression port;

an exhaust passage extending from the exhaust port;

a decompression passage extending from the decompression port and into the exhaust passage;

an exhaust port valve mounted adjacent the exhaust port and adjustable between a first position, in which the exhaust port valve restricts the axial extent of the exhaust port, and a second position, in which the exhaust port valve exposes the exhaust port throughout its axial extent;

a decompression port valve mounted adjacent the decompression port and adjustable between a first position, in which the decompression port valve exposes the decompression passage, and a second position, in which the decompression port valve blocks the decompression passage; and a valve control operatively connected to the exhaust port valve and to the decompression port valve and operable to simultaneously adjust the exhaust port valve and the decompression port valve between the first and second positions in response to an engine parameter.

* * * * *